(12) United States Patent
Williams (10) Patent No.: US 8,171,651 B2
(45) Date of Patent: May 8, 2012

(54) SQUARENESS TESTING INSTRUMENTS AND METHODS OF OPERATION THEREOF

(76) Inventor: James Williams, Medanales, NM (US)

( * ) Notice: Subject to any disclaimer, the term of this patent is extended or adjusted under 35 U.S.C. 154(b) by 0 days.

(21) Appl. No.: 12/918,320

(22) PCT Filed: Feb. 19, 2008

(86) PCT No.: PCT/US2008/054304
§ 371 (c)(1),
(2), (4) Date: Aug. 19, 2010

(87) PCT Pub. No.: WO2009/105093
PCT Pub. Date: Aug. 27, 2009

(65) Prior Publication Data
US 2010/0319208 A1  Dec. 23, 2010

(51) Int. Cl.
*G01B 5/24* (2006.01)
(52) U.S. Cl. .......................... 33/535; 33/418
(58) Field of Classification Search .............. 33/535, 33/418–421, 425, 427, 452–455, 465, 474, 33/1 BB, 23.04
See application file for complete search history.

(56) References Cited

U.S. PATENT DOCUMENTS

| | | | | | |
|---|---|---|---|---|---|
| 144,003 | A | * | 10/1873 | Waterbury | 33/465 |
| 183,608 | A | * | 10/1876 | Waterbury | 33/465 |
| 243,592 | A | * | 6/1881 | Marvick | 33/420 |
| 380,360 | A | * | 4/1888 | Spencer et al. | 33/43 |
| 1,238,536 | A | * | 8/1917 | Linn | 33/419 |
| 1,636,637 | A | * | 7/1927 | Hutchison | 33/454 |
| 2,658,278 | A | * | 11/1953 | Debs | 33/473 |
| 3,688,412 | A | | 9/1972 | Keener | |
| 3,805,392 | A | | 4/1974 | PeQueen | |
| 4,028,814 | A | | 6/1977 | Andrews | |
| 4,397,090 | A | * | 8/1983 | Nicyper | 33/25.1 |
| 4,835,877 | A | | 6/1989 | Roach et al. | |
| 5,551,160 | A | * | 9/1996 | Ferris et al. | 33/452 |
| 5,617,642 | A | * | 4/1997 | Marios | 33/526 |
| 6,049,990 | A | | 4/2000 | Holland | |
| 6,122,834 | A | | 9/2000 | Rester | |
| 6,134,797 | A | * | 10/2000 | Boyce | 33/464 |
| 6,195,903 | B1 | * | 3/2001 | Inglehart | 33/454 |
| 6,467,179 | B1 | * | 10/2002 | Wolf | 33/474 |
| 6,877,238 | B2 | * | 4/2005 | Kanaga | 33/455 |
| 7,082,692 | B2 | * | 8/2006 | Shapiro | 33/473 |
| 7,197,833 | B1 | | 4/2007 | Ekern | |

(Continued)

FOREIGN PATENT DOCUMENTS

DE  3503920  12/1985

(Continued)

*Primary Examiner* — Yaritza Guadalupe-McCall
(74) *Attorney, Agent, or Firm* — Franklin & Associates International LLC; Matthew F. Lambrinos (57) ABSTRACT

A squareness testing instrument (1, 100, 200) has one or more pairs of arms (2,3, 122,123), such as a one or more pairs of slats or rods, pivotally interconnected using suitable fasteners (4). The one or more pairs of arms are shaped such that they can fit substantially squarely into a corresponding imaginary rectangle (6A, 6B, 106, 206) with at least some arm ends (8, 108, 128, 208) in contact with sides thereof irrespective of the relative pivotal positioning of the arms. The instrument is positionable inside a frame type structure (14, 114) and pivotable apart to try and bring at least some of the arm ends in contact with sides (18, 19, 118, 119) of the structure to test at least one of the squareness and parallelism thereof.

19 Claims, 9 Drawing Sheets

U.S. PATENT DOCUMENTS

| | | |
|---|---|---|
| 7,254,898 B1 | 8/2007 | Armstrong |
| 7,310,884 B2 * | 12/2007 | Fleischer .................. 33/1 K |
| 2007/0220760 A1 | 9/2007 | Price |
| 2010/0319208 A1 * | 12/2010 | Williams .................. 33/535 |

FOREIGN PATENT DOCUMENTS

| | | |
|---|---|---|
| DE | 202006012997 U | 11/2006 |
| GB | 1176558 | 1/1970 |
| WO | 2007122455 A1 | 11/2007 |

* cited by examiner

SQUARENESS TESTING INSTRUMENTS AND METHODS OF OPERATION THEREOF

TECHNICAL FIELD

Embodiments relate to construction tools and, more particularly, to instruments for checking the squareness of frame type constructions. Embodiments also relate to methods of operating such instruments to check the squareness of frame type constructions.

BACKGROUND

Most professional woodworkers, metal workers and multiple-run production shops have tools including jigs and fixtures to guarantee that their products are square. Assuring squareness of frame type structures, such as for example drawers, carcasses and frames in varying sizes, without such tools can be problematic. Instruments such as try squares, framing squares and sliding sticks, can be used to check squareness but squaring a frame using these instruments is time consuming and awkward.

An improved apparatus for checking the squareness of frame type structures is needed. It is believed that the squareness testing instrument and method of operation thereof according to the illustrative embodiments described hereinafter provides an effective way of testing the squareness of such frame type structures.

SUMMARY

The following summary of the invention is provided to facilitate an understanding of some of technical features related to techniques, apparatus and methods for checking the squareness and parallelism of frame type structures, such as but not limited to drawers, carcasses, boxes and other frame type structures and is not intended to be a full description. Examples of apparatus and their methods of operation are described for checking the parallelism of opposite sides, squareness of corners, and squareness and parallelism of frame type structures. A full appreciation of the various aspects of the invention can be gained by taking the entire specification, claims, drawings, and abstract as a whole.

The aforementioned aspects of the invention and other objectives and advantages can now be achieved as described herein.

According to one aspect, a frame squareness testing instrument comprises a pair of arms of equal length, wherein each of the arms has opposite ends for contacting inner sides of a frame structure; and wherein the arms are pivotally interconnected at a pivot point at the centers of the arms and equidistant from the opposite ends; wherein the pivot point is fixed and untranslatable along the axis of the arms; and wherein each of the arm ends is shaped such that, irrespective of the relative pivotal positioning of the arms, the pair of arms fit squarely into a corresponding rectangular frame with each of the arm ends in contact with adjoining inner sides of a respective corner of the corresponding rectangular frame so that there are eight points of contact between the pair of arms and the corresponding frame, whereby the pair of arms are positionable inside a structure and pivotable apart to try and bring the arm ends in contact with inner sides of the structure to test at least one of the squareness and parallelism thereof.

The squareness testing instrument provides an effective approach for checking the squareness of frame or other type structures and can be utilized to check the squareness of frames of different sizes.

According to another aspect, a frame squareness testing instrument comprises a pair of arms comprising a shorter arm and a longer arm, wherein the arms are pivotally interconnected at a pivot point at the center of the longer arm, the pivot point being fixed and untranslatable along the axis of the arms and being equi-distant from opposite ends of the longer arm and a distal end of the short arm; wherein the longer arm ends and the shorter arm distal end are shaped such that, irrespective of the relative pivotal positioning of the arms, the pair of arms fit squarely into a corresponding rectangular frame with each of the opposite ends of the longer arm and the distal end of the shorter arm in contact with adjoining inner sides of a respective corner of the corresponding frame so that there are six points of contact between the pair of arms and the corresponding frame; and whereby the pair of arms are positionable inside a structure and pivotable apart to try and bring the opposite ends of the longer arm and the distal end of the shorter arm in contact with sides of the structure to test the squareness thereof.

According to yet another aspect, a frame squareness testing instrument comprises at least two pairs of arms; the at least two pairs of arms comprising a first pair of arms and a second pair of arms; wherein each arm of the first pair of arms and each arm of the second pair of arms has a first end for contacting inner sides of a frame structure and a second end opposite the first end; wherein the first pair of arms are pivotally interconnected at a first pivot point between the first and second ends of each arm of the first pair of arms; the first pivot point being equidistant from the first ends of the first pair of arms; wherein the second pair of arms are pivotally interconnected at a second pivot point between the first and second ends of each arm of the second pair of arms; the second pivot point being equidistant from the first ends of the second pair of arms; wherein the second end of one arm of the first pair of arms is pivotally interconnected at a third pivot point with a corresponding second end of one arm of the second pair of arms and wherein the second end of the other arm of the first pair of arms is pivotally interconnected at fourth pivot point with a corresponding second end of the other arm of the second pair of arms such that the first pair of arms and the second pair of arms are linked side by side in a row; wherein each one of the pivot points is fixed and untranslatable along the axis of the arms; and wherein each one of the first ends and second ends are shaped such that, irrespective of the relative position of the arms, the pairs of arms fit squarely into a corresponding rectangular frame structure with each of the first ends in contact with adjoining inner sides of a respective corner of the corresponding rectangular frame so that there are eight points of contact between the first and second pairs of arms and the corresponding frame.

According to yet another aspect, there is provided a method of testing, with a frame squareness testing instrument, the squareness of a frame structure; the squareness testing instrument comprising a pair of arms of equal length, wherein each of the arms has opposite ends for contacting inner sides of a structure; and wherein the arms are pivotally interconnected at a pivot point at the centers of the arms and equi-distant from the opposite ends; wherein the pivot point is fixed and untranslatable along the axis of the arms; and wherein each arm end is shaped such that, irrespective of the relative pivotal positioning of the arms, the pair of arms fit squarely into a corresponding rectangular frame with each of the arm ends in contact with adjoining inner sides of a respective corner of the corresponding rectangular frame so that there are eight points of contact between the pair of arms and the corresponding frame; the method comprising positioning the pair of arms inside a frame structure; and folding apart the pair of arms to try and squarely fit the arms inside the structure with the arm ends in contact with the inner sides of the structure to thereby test at least one of the squareness or parallelism.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment of the present invention and are not intended to limit the scope of the invention.

Figure 1:
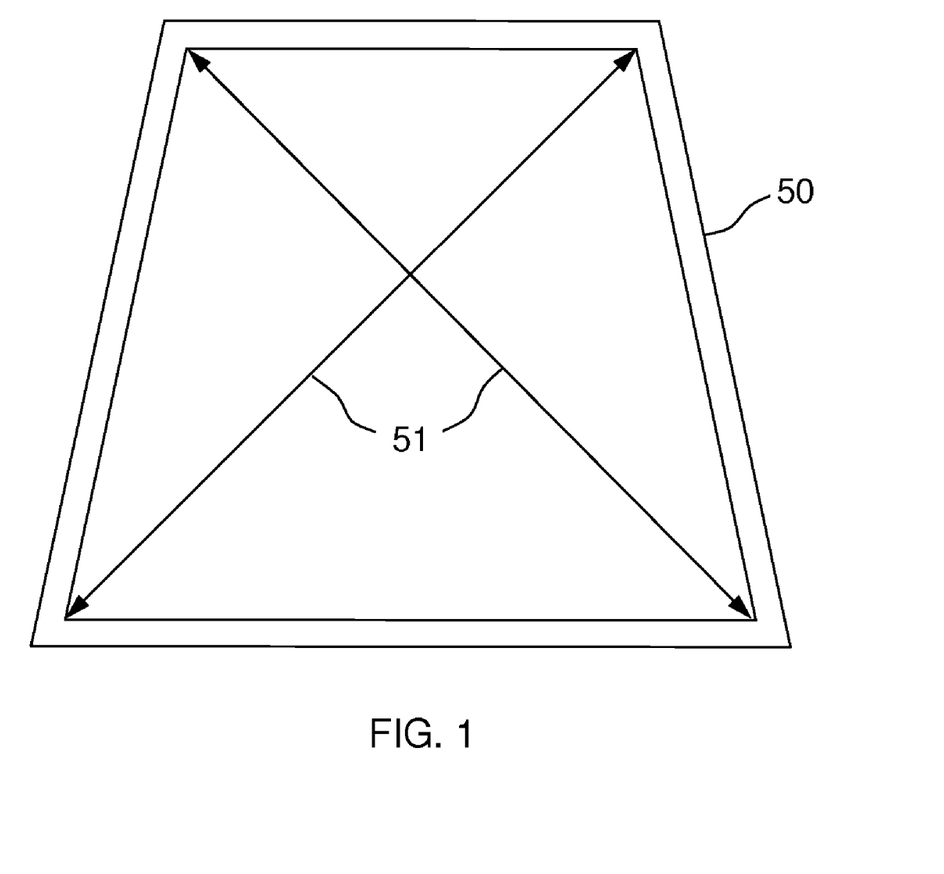
FIG. 1 illustrates an example of an unsquare frame.

It has been determined that squaring frame type structures by measuring the diagonals is time consuming and awkward. Typically, it is necessary to measure one diagonal of the frame, measure the other, tighten a diagonal clamp holding the frame sides in place, recheck and so on, all while trying to work around and under the clamp. Squaring a drawer trying to measure across the inside diagonal corners of a drawer with a tape measure is all but impossible. "Sliding sticks" eliminate having to actually measure anything but still they are awkward to get in and around the clamp. Furthermore, it is also possible to get "double-crossed" by measuring the diagonals of the frame. The presumption is that a box is square if the lengths across opposite corners measure the same. This is true, however, only when opposite sides are equal lengths. By way of example, FIG. 1 of the accompany drawings illustrates a side view of an out of square box or frame 50 in the shape of a regular trapezoid in which the diagonals 51 thereof measure the same length, but the box 50 is definitely not square.

Technical features described in this application can be used to construct various squareness testing instruments which provide an effective and more convenient way of testing or checking the squareness of frame type structures. For example, in one implementation, the squareness testing instrument can comprise a pair of arms pivotally interconnected such that the arms are pivotable relative to one another. Each arm is shaped such that the pair of arms can fit substantially squarely into a corresponding imaginary rectangle with at least some arm ends in contact with sides thereof irrespective of the relative pivotal positioning of the arms. The pair of arms can be positioned inside the structure to be tested and pivoted apart to try and bring at least some of the arm ends in contact with sides of the structure to thereby test at least one of the squareness and parallelism thereof.

For example, in another implementation, the squareness testing instrument can comprise two or more pairs of arms. Each pair of arms can be pivotally interconnected such that the arms of each pair of arms are pivotable relative to one another. Arms of one of the pairs of arms are further pivotally connectable to respective arms of a next one of the pairs of arms such that the pairs of arms are linkable side by side in a row. The arms are shaped such that, when the pairs of arms are so linked, the pairs of arms can always occupy substantially squarely an imaginary rectangle with at least some arm ends in contact with sides thereof. The linked pairs of arms can be positioned inside a structure and foldable apart to try and bring at least some arm ends in contact with sides of the structure to thereby test at least one of the squareness or parallelism thereof.

As will be explained in more detail below, the squareness testing instruments of the illustrative embodiments provide a more effective approach for checking the squareness of frame type structures than with other measuring tools, such as known try squares and frame squares. The testing instruments of the illustrative embodiments are also more versatile in that the testing instruments can check the squareness of frames of a variety of different sizes unlike known try squares, which are generally too small to be very accurate for large frames, and framing squares, which are often too big to fit inside desk-sized drawers and too awkward to check the outsides of drawers that have overhanging fronts.

Figure 2:
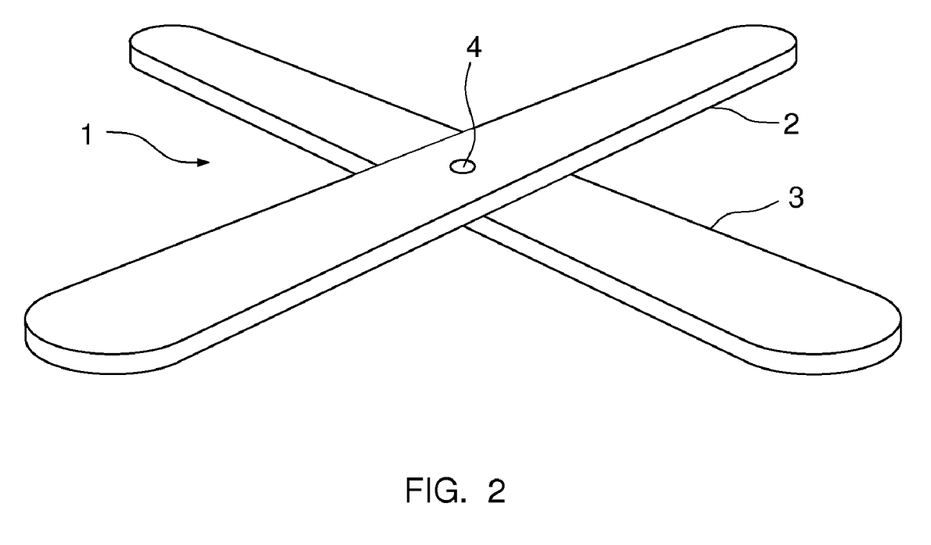
FIG. 2 illustrates a perspective view of a squareness testing instrument according to one embodiment.

Referring to FIG. 2 of the accompanying drawings, which illustrates a perspective view of a squareness testing instrument according to one embodiment, testing instrument 1 comprises a pair of arms 2, 3 pivotally interconnected such that the arms can be freely pivoted relative to one another. In this particular embodiment, arms 2, 3 are of equal length and pivotally interconnected at their centers thereby forming an X-square. The centers of the arms can be pivotally attached together using an appropriate fastener 4, such as for example a pivot pin or rivet. Arms 2, 3 can be freely pivoted between a fully open configuration in which the arms overlap substantially perpendicular to one another and a fully closed configuration in which the arms overlap substantially parallel to one another.

Testing instrument 1 can fit substantially squarely into an imaginary rectangle no matter how the arms 2, 3 are pivotally positioned. For example, if arms 2,3 are pivoted wide apart, testing instrument 1 can fit squarely into a large imaginary rectangle 6A as shown in FIG. 3A but if the arms are pivoted closer together, testing instrument 1 can fit squarely into a smaller imaginary rectangle 6B as shown in FIG. 3B.

Arms 2, 3 can be fabricated in rectangular shapes from a stiff wood material to form slats. Other suitably rigid materials such as for example plastic or metal may alternatively be used. The thickness and width of the arms can vary depending on material and application. Other elongated shaped structures of equal length may be adopted as arms instead of rectangular structures. For example, sticks, rods or blades can be used as arms 2, 3. Any shaped arms can be utilized which have opposite ends 8 for contacting sides of a structure and shaped to enable the testing instrument 1 to fit substantially squarely into an imaginary rectangle no matter how the arms 2, 3 are pivotally positioned relative to one another.

Figure 3A:
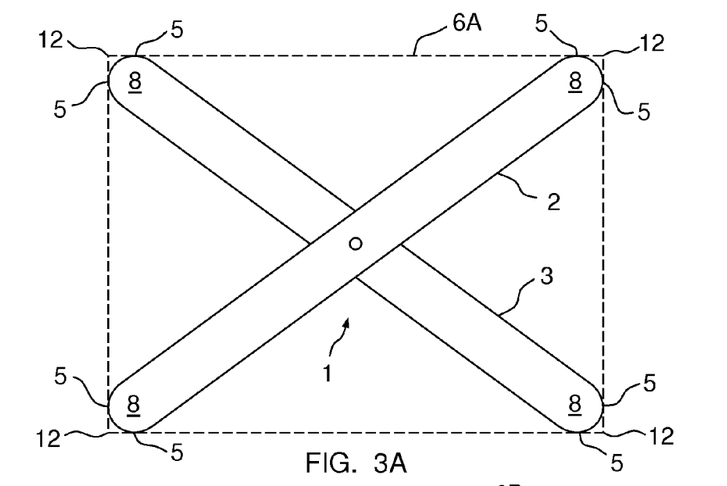
FIG. 3A illustrates a plan view of the instrument of FIG. 2 in which the arms thereof are pivoted apart and fit substantially squarely into a corresponding imaginary rectangle.
Figure 3B:
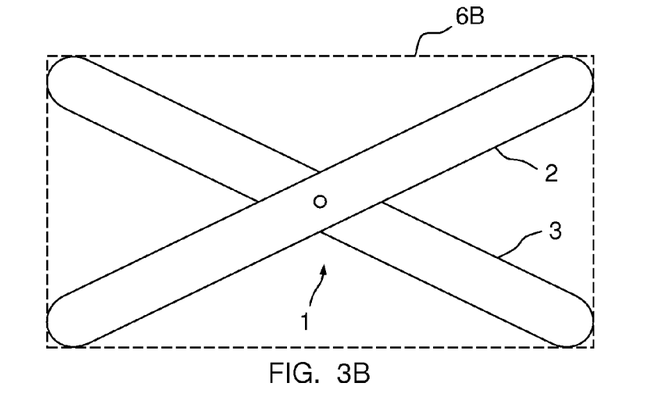
FIG. 3B illustrates the instrument of FIG. 2 in which the arms are pivoted closer together than in FIG. 3A and fit substantially squarely into a corresponding imaginary rectangle which is smaller than the imaginary rectangle of FIG. 3A.

In the example of the testing instrument of FIGS. 3A & 3B, arm ends 8 are identical and shaped to form semi-circular convex ends which contact corresponding corners 12 of the imaginary rectangle. Each arm end 8 is shaped to contact adjoining sides of a respective corner 12 of the imaginary rectangle, as shown for example in FIGS. 3A and 3B, so that there are two points of contact 5 between each arm end 8 and each corner 12. In this particular embodiment in which the pair of arms are arranged as an X-square, four arms ends 8 of the X-square are in respective contact with four corners 12 of the rectangle so that there are always eight points of contact between the X-square and the imaginary rectangle. As will be explained in more detail below with reference to methods of operating the squareness testing instrument, providing arm ends 8 shaped such that the arm ends 8 can contact corresponding corners 12 of the imaginary rectangle enables both the squareness and parallelism of frames to be tested at the same time.

Figure 3C:
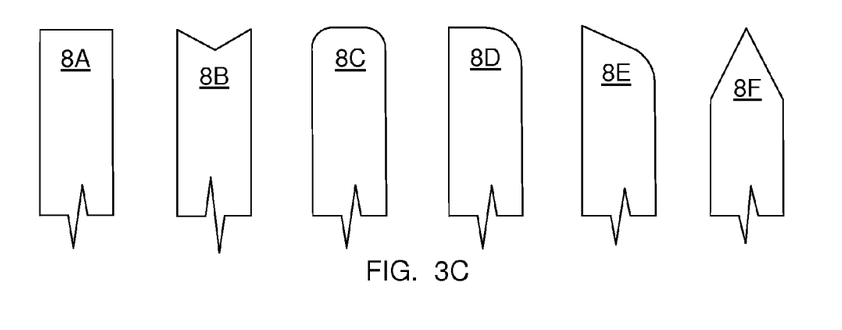
FIG. 3C illustrates general examples of different shaped arm ends of testing instruments according to alternative embodiments.

Whilst the arm ends are circular shaped, other shaped ends can alternatively be used. Some examples of alternative arm ends that can be used instead of the semi-circular shaped arm ends are shown in FIG. 3C. Each arm end can be for example a square shaped end 8A, a V-shaped end 8B, a rounded corners square end 8C, a quarter-circular shaped end 8D or other at least partially rounded end, a partially angled and curved end 8E, or a single pointed shaped end 8F. Whilst operating satisfactorily, testing instruments with square or single-pointed arm ends are somewhat vulnerable to wear and tear.

Arm ends 8 can be any shape which enable instrument 1 to fit substantially squarely into a corresponding imaginary rectangle no matter how the arms 2, 3 are positioned. Furthermore, whilst arm ends 8 of instrument 1 of FIG. 2 are all the same shape, arm ends 8 can also be shaped differently from one another provided the instrument can still fit substantially squarely into a corresponding imaginary rectangle irrespective of the pivotal positioning of the arms.

Methods of operation of the squareness testing instrument 1 of FIG. 2 will now be described with reference to particular examples in which instrument 1 is used to check the parallelism and squareness of frame or box type structures.

Figure 4A:
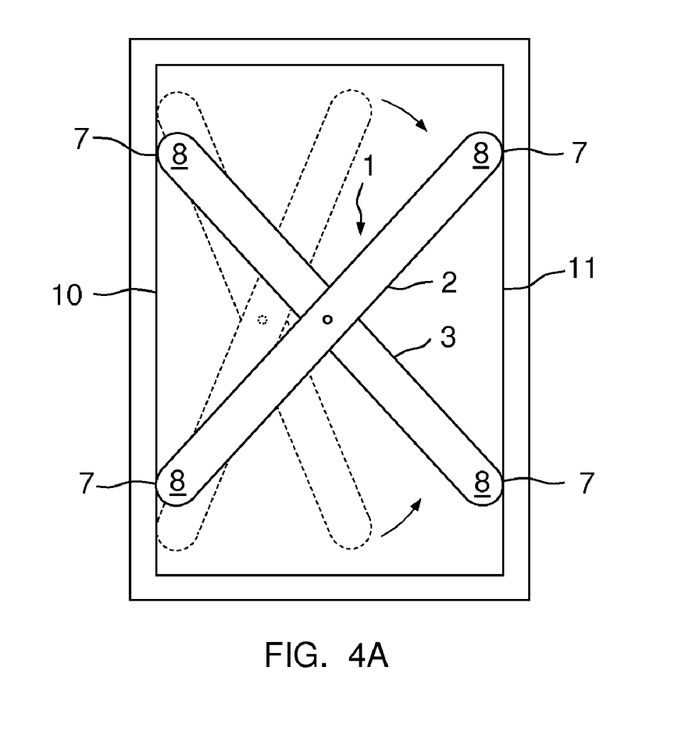
FIGS. 4A to 4B illustrate plan views of the instrument of FIG. 2 positioned between opposite sides which are square and wide at the bottom, respectively.
Figure 4B:
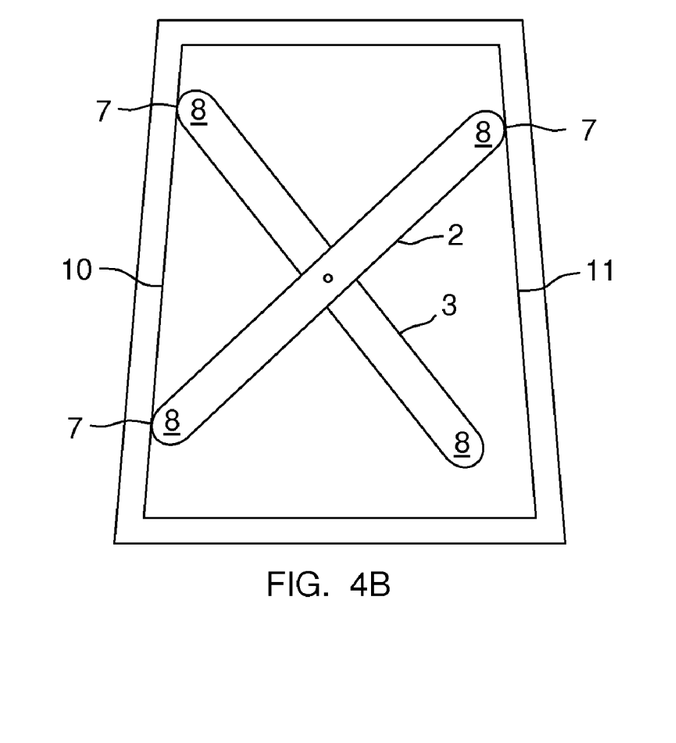

FIGS. 4A and 4B illustrate methods of operation of the squareness testing instrument 1 according to one embodiment in which instrument 1 is being used to check opposite sides 10, 11 which are parallel, wide at the bottom, and wide at the top (not shown), respectively.

Referring to FIG. 4A, after having initially pivoted arms 2,3 sufficiently close together to enable instrument 1 to be placed between two opposite sides 10,11, the user tests for the parallelism of the opposite sides by pivoting the arms 2,3 further apart to bring the arm ends 8 into contact with the interior faces of sides 10,11.

As the two opposite sides 10, 11 shown in FIG. 4A are parallel, opposite arm ends 8 of each arm 2, 3 contact with the respective opposite sides 10, 11 so that there are four points of contact 7 between instrument 1 and sides 10, 11. When there are only three points of contact 7, the sides 10, 11 are either wide at the bottom as shown in FIG. 4B, or wide at the top (not shown). In either case, only one arm 2 or 3 can contact both sides 10, 11 and the other arm 3 or 2 is free to pivot back and forth. Four points of contact 7 will therefore ensure that the two opposite sides are parallel.

Figure 5A:
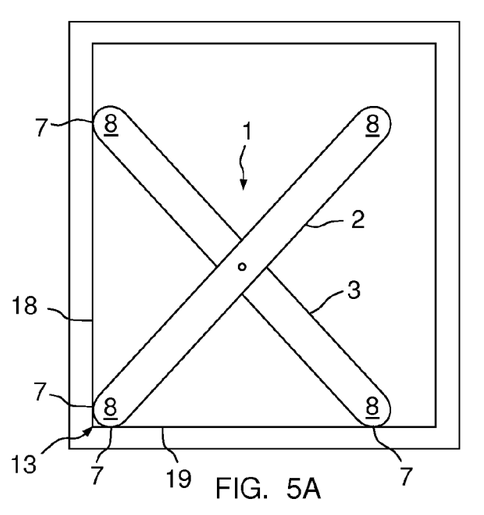
FIGS. 5A to 5C illustrate plan views of the instrument of FIG. 2 positioned in corners which are square, acute and obtuse, respectively.
Figure 5B:
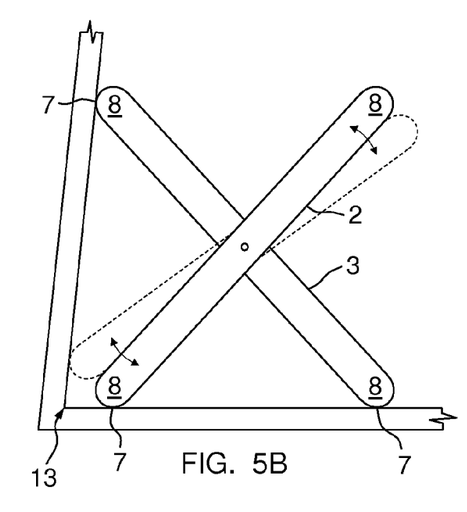
Figure 5C:
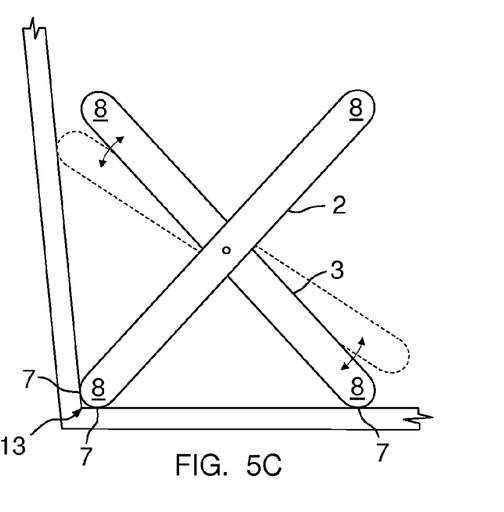

FIGS. 5A to 5C illustrate methods of operation of the squareness testing instrument 1 according to one embodiment in which instrument 1 is being used to check the squareness of corners which are square, acute and obtuse, respectively. Referring to FIG. 5A, after having placed instrument 1 in the corner 13 to be checked, the user tests for the squareness of the corner by pivoting the arms 2,3 to bring the arm ends 8 in contact with the adjoining sides 18, 19 of corner 13. As the corner is square, arm end 8 located proximate the corner apex contacts adjoining sides 18, 19 of corner 13. Opposite arm ends 8 of the other arm 3 also contact adjoining sides of the corner at positions away from the corner apex resulting in a total of four points of contact 7, as shown in FIG. 5A.

When there are only three points of contact, corner 13 is either acute (less than 90 degrees) or obtuse (greater than 90 degrees), as shown in FIGS. 5B and 5C, respectively. If the corner 13 is acute, arm 2 remains loose that is, it is able to pivot freely between the corner sides, and end 8 of the arm 2 located proximate the corner apex cannot contact both corner sides of the corner at the same time (see FIG. 5B). If corner 13 is obtuse, arm 3 pivots freely between the corner sides and opposite ends 8 of arm 3 cannot contact both corner sides at the same time (see FIG. 5C). Four points of contact 7 between instrument 1 and corner 13 will therefore ensure that corner 13 is square.

Figure 6A:
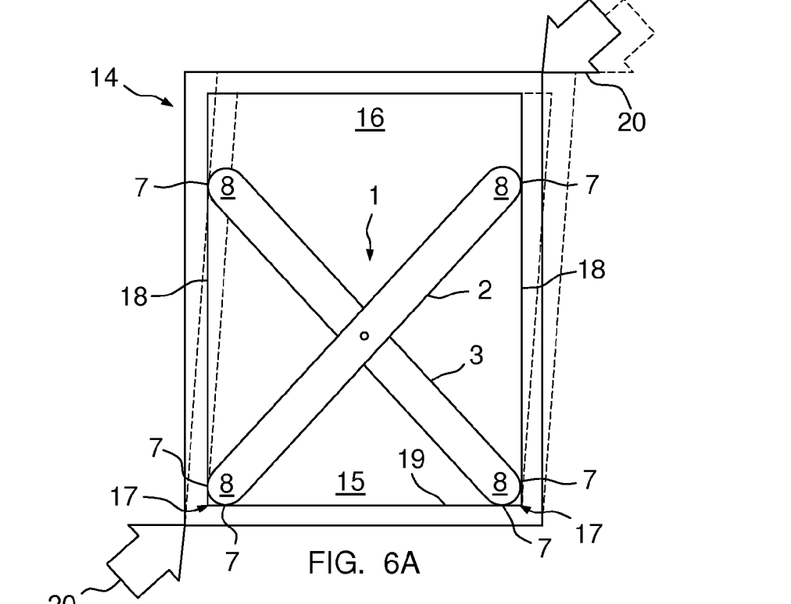
FIGS. 6A and 6B illustrate plan views of the instrument of FIG. 2 positioned inside a square frame and out of square frame, respectively.
Figure 6B:
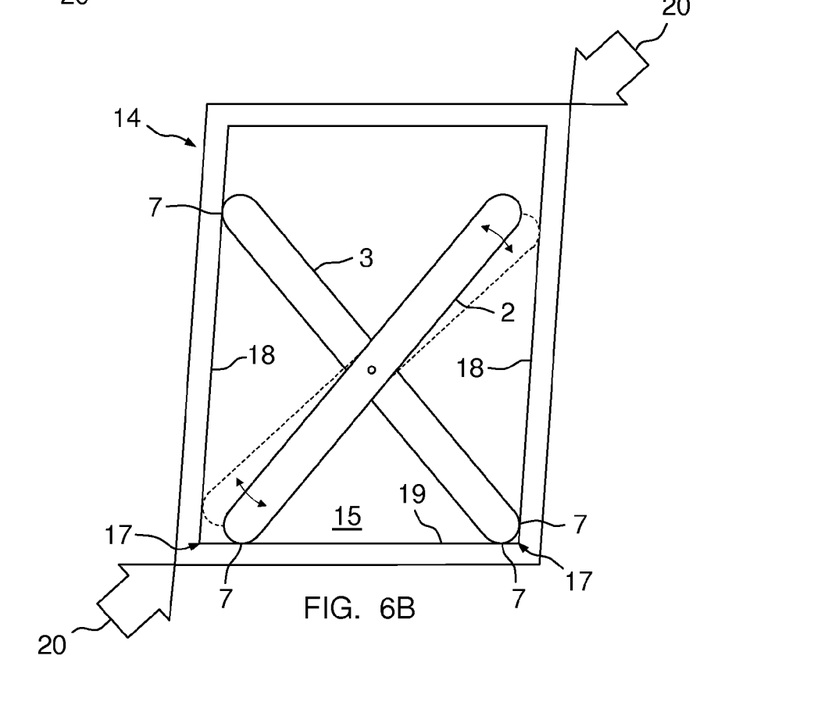

FIGS. 6A and 6B illustrate methods of operation of the squareness testing instrument 1 according to one embodiment in which the testing instrument is being used to check the squareness of box or frame type structures which are square and out of square, respectively. Referring to FIG. 6A, after having initially pivoted arms 2, 3 sufficiently close together to enable instrument 1 to be placed in one end 15 of the frame 14, the user tests for the squareness of the frame end 15 by pivoting the arms 2, 3 apart to bring the arm ends 8 in contact with sides of the frame end 15, as shown in FIG. 6A. As frame end 15 is square, two arm ends 8 are in contact with adjoining sides 18, 19 of respective frame end corners 17. Also, the other two arm ends 8 located away from the frame end corners 17 are in contact with respective opposite sides 18 of the end frame resulting in a total of six points of contact 7, as indicated in FIG. 6A.

If, however the frame end 15 is out of square, the arm end 8 located proximate the acute corner cannot contact both corner sides at the same time and arm 2 is loose in the corner and can wiggle back and forth, as shown in FIG. 6B. As a result, only four or five points of contact 7 between the instrument 1 and frame end 15 can be made at any one time.

Six points of contact 7 between instrument 1 and sides will therefore ensure that the one end of the box or frame is square, that is, that the corners of the one end are square and the opposite sides are parallel. In this manner, both the parallelism and the squareness of a frame end can be tested at the same time. Testing frame type structures for squareness then becomes a fast and easy task. A user can simply place instrument 1 inside one end of the frame structure whose squareness is being tested and pivot the arms 2, 3 to test the end. If the structure feels "solid" (six points of contact) then that end of the frame is square. The user can then place instrument 1 inside the other end of the frame to test the other end. If the structure feels "solid" at the other end as well, the frame is truly square all around.

Furthermore, instrument 1 allows the user to continuously monitor the squaring up progress. For example, the out of square frame of FIG. 6B can be brought back into square by the user holding instrument 1 in a corner of the out of square frame with one hand and applying pressure across the diagonal of the acute corner (loose corner), as indicated by arrows 20 until there are six points of contact 7 made between instrument 1 and the frame end and the instrument 1 feels solid, as shown in FIG. 6A. For example, the user can hold instrument 1 in a skewed drawer with one hand, tighten the clamp across the diagonal with the other, and watch the drawer gradually come into square.

Instrument 1 can also be used to check for squareness even if arms 2, 3 do not reach fully across a frame by simply checking the corners of each end of the frame. Unlike an L-square, instrument 1 does not have to be rotated or flipped over when moving from corner to corner. Instead instrument 1 can be slid across between opposite ends of the frame. After use, the instrument can be conveniently collapsed by pivoting the arms together for easy storage or carriage.

A squareness testing instrument according to another embodiment will now be described with reference to the testing instrument 100 of FIG. 7 in which two pairs of arms are operably linked together such that the testing range of the instrument is extended in comparison to the testing instrument 1 of FIG. 2.

A first pair of arms 101 is pivotally interconnected at a first pivot point 110. First pivot point 110 is located between opposite first and second ends 108,109 of each arm 102,103 of the first pair of arms and equi-distant from the first arm ends 108. A second pair of arms 121 is pivotally interconnected at second pivot point 130. The second pivot point 130 is located between opposite first and second ends 128,129 of each arm 122,123 of the second pair of arms and is equi-distant from the first arm ends 128 of the second pair of arms.

The second arm ends 109 of arms 102,103 are pivotally connectable at third pivot points 104 to the respective second arm ends 129 of arms 122,123 such that the pairs of arms 101, 121 are linkable side by side in a row with the pair of first ends 108 being arranged at one end of the linked pairs of arms and the other pair of first ends 128 being arranged at the other end. Third pivot points 104 are equi-distant from first pivot point 110 and also equi-distant from second pivot point 130. The arms are pivotally interconnected using suitable fasteners. First ends 108, 128 are free to contact sides of a structure and shaped such that the linked pairs of arms can always fit squarely in a corresponding imaginary rectangle irrespective of the relative pivotal positioning of all the arms 102, 103, 122, 123, as shown in FIG. 7.

Figure 7:
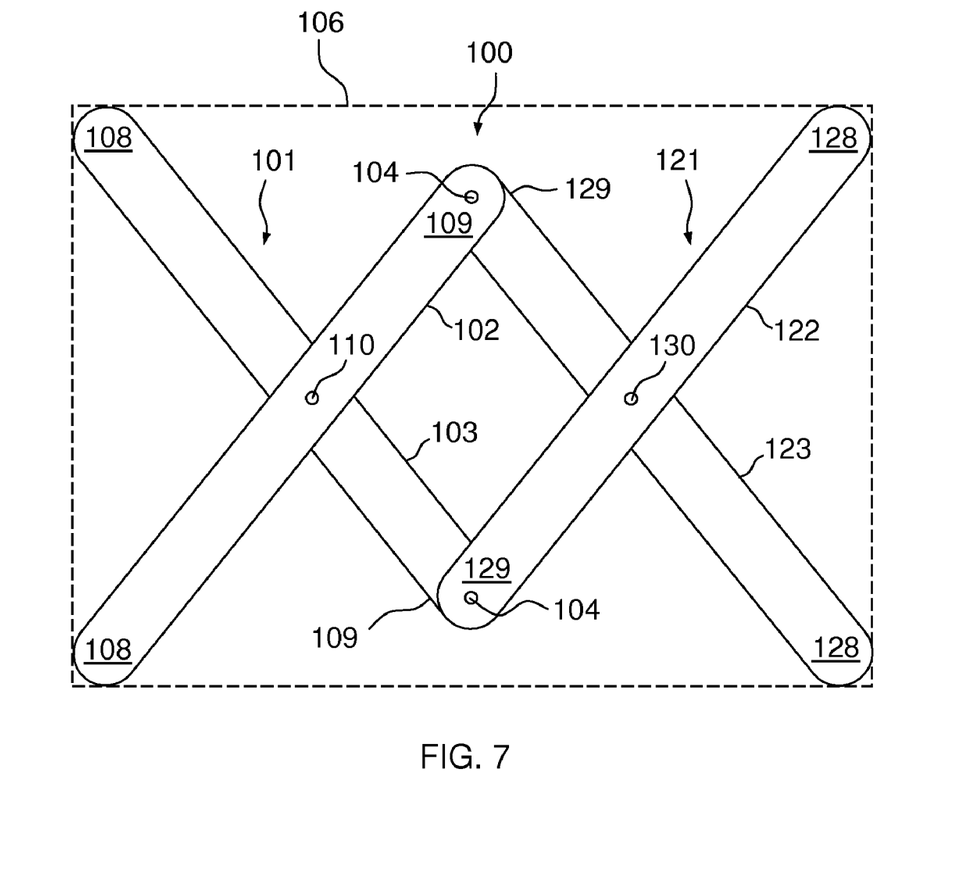
FIG. 7 illustrates a plan view of a squareness testing instrument according to another embodiment.

Whilst the first pair of arms 101 and second pair of arms 121 are the same length in the testing instrument 100 of FIG. 7, the first pair of arms can alternatively be a different length from the second pair of arms. Furthermore, the distance between third pivot points 104 and the first pivot point 110 of the first pair of arms need not be the same as the distance between the third pivot points 104 and the second pivot point 130 of the second pair of arms as would be the case for example when the second pair of arms is longer than the first pair of arms (not shown). Furthermore, the third pivot points 104 can be spaced from the second arm ends 109, 129. Also, one or both of the first and second pivot points 110, 130 can be located at the centers of the arms so that one or both of the first and second pairs of arms are in the form of an X-square similar to that shown in FIG. 2. Whilst free first arm ends 108, 128 of the instrument of the embodiment of FIG. 7 are semi-circular convex shaped ends, arm ends can be of any shape which enables them to contact corners of the imaginary rectangle irrespective of the relative pivotal positioning of the arms.

If necessary, second ends 109 can be detachably fastened to respective second ends 129 utilizing detachable fasteners. Detachably fastening the first pair of arms 101 to the second pair of arms 121 in this manner provides the user with the flexibility to attach a pairs of arms of one chosen length to another pair of arms with another chosen length to thereby set the testing range of the instrument according to the application. The pairs of arms can be simply collapsed together, either while attached or detached, for storage and easy transportation.

One or more additional pairs of arms can be further linked to the pairs of arms 101 of FIG. 7 if further extension of the testing range of the instrument is necessary (not shown). Two or three pairs of arms of different lengths are generally sufficient to provide the user with a variety of options for extending the measurement range of the testing instrument according to particular application requirements. For example, X-squares in 10", 16" and 24" lengths serve the needs for checking the squareness of desk-sized drawers however longer X-square lengths are required to check a larger frame type structure, such as a door frame of a building.

Figure 8:
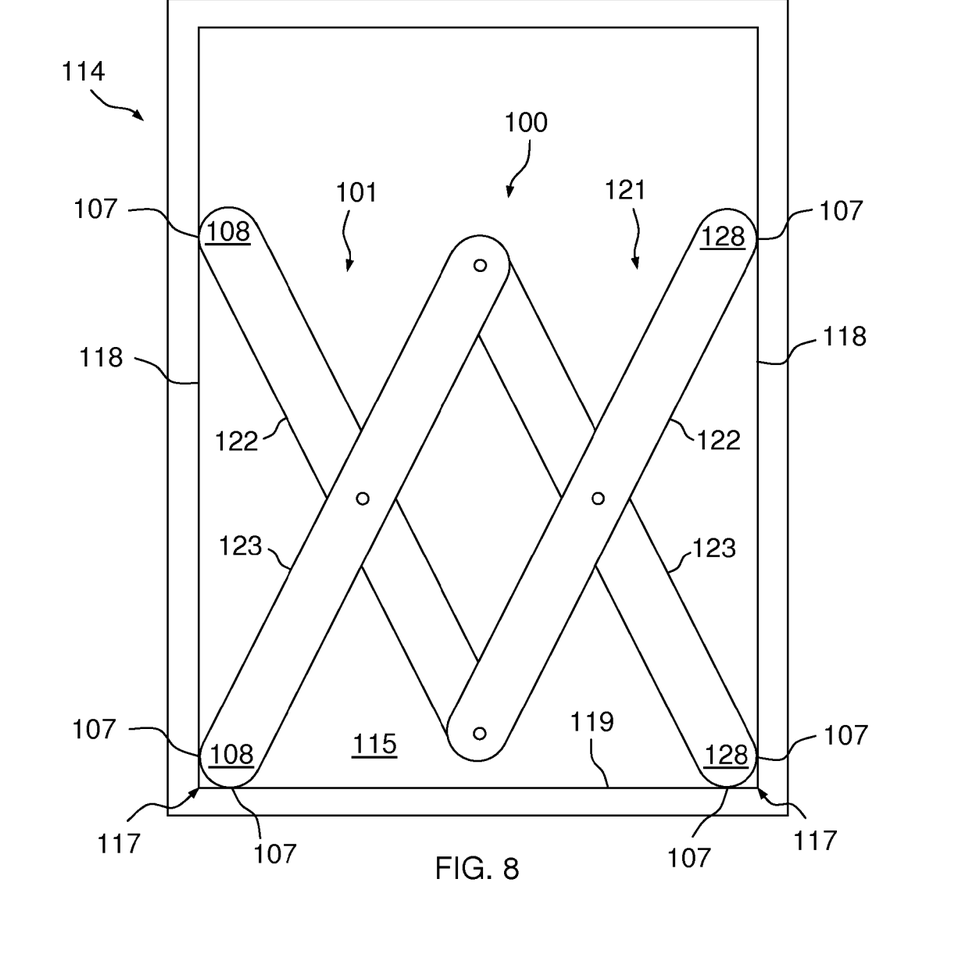
FIG. 8 illustrates a plan view of the testing instrument of FIG. 7 positioned inside a square frame.

The method of operation of the testing instrument 100 of FIG. 7 will now be described according to one embodiment. After having positioned instrument 100 in one end of a frame, the pairs of arms 101,121 are pivoted apart to try and bring free arm ends 108,128 in contact with sides of the structure to squarely fit the instrument in the structure and verify the squareness or parallelism thereof. For example, FIG. 8 illustrates the testing instrument 100 positioned in one end 115 of a frame type structure 114 with the pairs of arms 101, 121 pivoted apart and fit squarely in the square frame end. Conditions that need to be met for the purpose of ensuring the squareness of the structure can be understood by comparing the instrument operation with operation of the instrument 1 of FIG. 2 having the single pair of arms. As can seen in FIG. 8, for testing the squareness of opposite sides, four points of contact 107 between the free first arm ends 108,128 of instrument 100 and the structure opposite sides 118 ensures the two opposite sides are parallel. Four points of contact between free arm ends 108, 128 and a pair of adjoining sides 118, 119 of a corner 117 ensures the corner is square. For checking the squareness of the frame end 115, six points of contact between the free arm ends 108, 128 and the frame end ensure the frame end is square.

Figure 9:
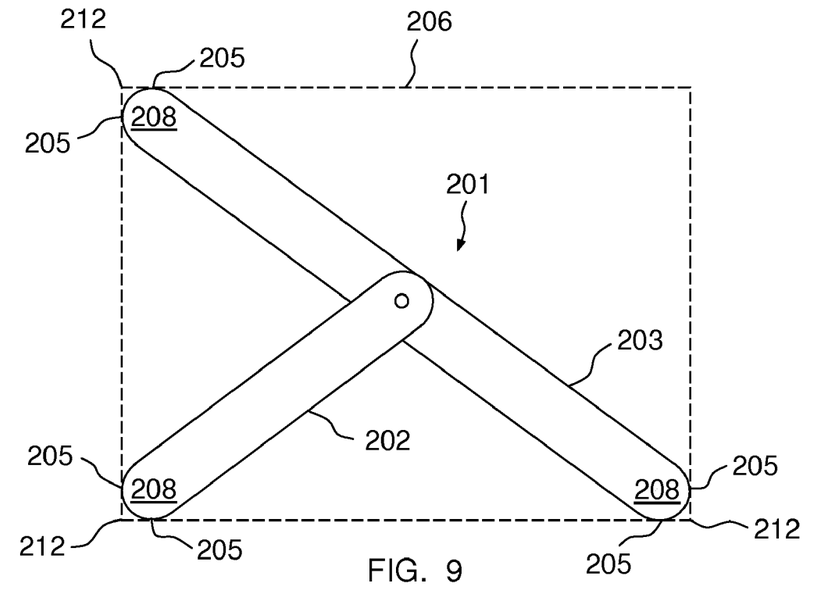
FIG. 9 illustrates a plan view of a squareness testing instrument according to yet another embodiment.

A squareness testing instrument according to another embodiment is shown in FIG. 9. The instrument 201 of this embodiment has a pair of arms 202,203. One arm 202 is shorter in length than the other arm 203. Shorter arm 202 is pivotally connected at the center of the longer arm such that the distal end 208 of the short arm can be pivoted to precisely overlap either opposite end 208 of the longer arm. Arm ends 208 are shaped such that instrument 201 can always occupy substantially squarely a corresponding imaginary rectangle 206 irrespective of the relative pivotal positioning of the arms 202,203 with arm ends 208 in contact with three respective corners 212 so that there are six points of contact 205 between the pair of arms and the rectangle.

Whilst arm ends 208 of instrument 200 are identical semi-circular convex shaped ends, free arm ends 208 can be of any shape which enables them to contact respective corners of the imaginary rectangle irrespective of the relative pivotal positioning of the arms. In the embodiment of FIG. 9, an end of the shorter arm 202 is pivotally connected at the center of the longer arm to thereby form a Y square. However other configurations are envisaged. For example, the shorter arm can be longer than that shown in FIG. 9 in which case a portion proximate the shorter arm end rather than the shorter arm end itself would be pivotally connected to the center of the longer arm.

In use, the pair of arms is positionable inside a structure and pivotable apart to test at least one of the squareness and parallelism thereof. The method of operation is similar to that of the method of operation of the squareness testing instrument 1 of FIG. 2 with the exception that there are only six and not eight points of contact between the pair of arms and a frame end being tested when the frame end is square.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only.

Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics.

The invention claimed is:

1. A frame squareness testing instrument comprising
a pair of arms of equal length, wherein each of said arms has opposite ends for contacting inner sides of a frame structure; and wherein said arms are pivotally interconnected at a pivot point at the centers of said arms and equi-distant from said opposite ends; wherein said pivot point is fixed and untranslatable along the axis of said arms; and wherein each of said arm ends is shaped such that, irrespective of the relative pivotal positioning of said arms, said pair of arms fit squarely into a corresponding rectangular frame with each of said arm ends in contact with adjoining inner sides of a respective corner of said corresponding rectangular frame so that there are eight points of contact between said pair of arms and said corresponding frame, whereby said pair of arms are positionable inside a structure and pivotable apart to try and bring said arm ends in contact with inner sides of said structure to test at least one of the squareness and parallelism thereof.

2. The testing instrument of claim 1, wherein said pair of arms comprise a pair of slats, rods or blades.

3. The testing instrument of claim 1, wherein said arm ends are the same shape.

4. The testing instrument of claim 1, wherein at least some of said arm ends are of different shapes.

5. The testing instrument of claim 1, wherein said arm ends at least one arm end selected from the group consisting of a semi-circular round end, square shaped end, a V-shaped end, a rounded corners square end, a quarter-circular shaped end, an at least partially rounded end, a partially angled and curved end, or a single pointed shaped end.

6. The testing instrument of claim 1, wherein said arm ends are semicircular shaped ends.

7. A frame squareness testing instrument comprising a pair of arms comprising a shorter arm and a longer arm, and wherein said arms are pivotally interconnected at a pivot point at the center of the longer arm, said pivot point being fixed and untranslatable along the axis of the arms and being equi-distant from opposite ends of said longer arm and a distal end of said shorter arm; wherein said longer arm ends and said shorter arm distal end are shaped such that, irrespective of the relative pivotal positioning of said arms, said pair of arms fit squarely into a corresponding rectangular frame with each of said opposite ends of said longer arm and said distal end of said shorter arm in contact with adjoining inner sides of a respective corner of said corresponding frame so that there are six points of contact between said pair of arms and said corresponding frame; and whereby said pair of arms are positionable inside a structure and pivotable apart to try and bring the opposite ends of said longer arm and the distal end of the shorter arm in contact with sides of said structure to test the squareness thereof.

8. The testing instrument of claim 7, wherein said arm ends are the same shape.

9. The testing instrument of claim 7, wherein at least some of said arm ends are of different shapes.

10. The testing instrument of claim 7, wherein said arm ends are semicircular shaped ends.

11. A frame squareness testing instrument comprising
at least two pairs of arms; said at least two pairs of arms comprising a first pair of arms and a second pair of arms;
wherein each arm of said first pair of arms and each arm of said second pair of arms has a first end for contacting inner sides of a frame structure and a second end opposite the first end;
wherein the first pair of arms are pivotally interconnected at a first pivot point between the first and second ends of each arm of said first pair of arms; said first pivot point being equidistant from the first ends of said first pair of arms;
wherein the second pair of arms are pivotally interconnected at a second pivot point between the first and second ends of each arm of the second pair of arms; said second pivot point being equidistant from the first ends of said second pair of arms;
wherein the second end of one arm of said first pair of arms is pivotally interconnected at a third pivot point with a corresponding second end of one arm of said second pair of arms and wherein the second end of the other arm of said first pair of arms is pivotally interconnected at fourth pivot point with a corresponding second end of the other arm of the second pair of arms such that said first pair of arms and said second pair of arms are linked side by side in a row;
wherein each one of said pivot points is fixed and untranslatable along the axis of said arms; and
wherein each one of said first ends and second ends are shaped such that, irrespective of the relative position of said arms, said pairs of arms fit squarely into a corresponding rectangular frame structure with each of said first ends in contact with adjoining inner sides of a respective corner of said corresponding rectangular frame so that there are eight points of contact between said first and second pairs of arms and said corresponding frame,
whereby said linked pairs of arms are positionable inside a structure and foldable apart to try and bring said arm ends in contact with the sides of said structure to verify at least one of the squareness or parallelism thereof.

12. The squareness testing instrument of claim 11, wherein said first pair of arms is a different length from said at pair of arms.

13. The squareness testing instrument of claim 11, wherein the arms of said first pair of arms are of equal length and wherein said first pivot point is at the center of each arm of said first pair of arms thereby forming a first X-square; wherein the arms of said second pair of arms are of equal length and wherein said second pivot point is at the center of each arm of said second pair of arms thereby forming a second X-square; and wherein the second arm ends of said first X-square are both pivotally connectable to and detachable from respective second arm ends of the second X-square such that said X-squares are both linkable to and detachable from one another.

14. The testing instrument of claim 13, wherein said arm ends are semicircular shaped ends.

15. The squareness testing instrument of claim 11, wherein the arms of said first pairs of arms are of equal length and pivotally interconnected at the centers thereof thereby forming an X-square.

16. A method of testing, with a frame squareness testing instrument, the squareness of a frame structure; said squareness testing instrument comprising a pair of arms of equal length, wherein each of said arms has opposite ends for contacting inner sides of a structure; and wherein said arms are pivotally interconnected at a pivot point at the centers of said arms and equi-distant from said opposite ends; wherein said pivot point is fixed and untranslatable along the axis of said arms; and wherein each arm end is shaped such that, irrespective of the relative pivotal positioning of said arms, said pair of arms fit squarely into a corresponding rectangular frame with each of said arm ends in contact with adjoining inner sides of a respective corner of said corresponding rectangular frame so that there are eight points of contact between said pair of arms and said corresponding frame; the method comprising positioning said pair of arms inside a frame structure; and
folding apart said pair of arms to try and squarely fit said arms inside said structure with said arm ends in contact with the inner sides of said structure to thereby test at least one of the squareness or parallelism thereof.

17. The method of claim 16, wherein positioning said pair of arms inside said structure comprises positioning said pair of arms in a corner of said frame structure and wherein folding apart said pair of arms to try and squarely fit said arms inside said structure comprises folding apart said arms
to try and make four points of contact between said arm ends and adjoining sides of said corner.

18. The method of claim 16,
wherein positioning said pair of arms inside said frame structure comprises positioning said pair of arms in the end of said frame structure having an end side interconnecting opposing sides; and wherein folding apart said pair of arms to try and squarely fit said arms inside said structure further comprises folding apart said arms to try and make six points of contact between said arm ends and said frame type structure end to test both the squareness and parallelism thereof.

19. The method of claim 18, wherein said frame structure comprises an out of square frame; and further comprising urging said out of square frame into square by applying pressure across the diagonal of an acute corner, until six points of contact are made between the arm ends and the frame.

* * * * *